United States Patent [19]

Glenn

[11] 4,045,836
[45] Sept. 6, 1977

[54] AUTOMOBILE POLISHING APPARATUS

[76] Inventor: Robert M. Glenn, 1410 Clarendon, Bloomfield Hills, Mich. 48013

[21] Appl. No.: 653,633

[22] Filed: Jan. 29, 1976

[51] Int. Cl.² .............................................. B60S 3/06
[52] U.S. Cl. ..................................... 15/4; 15/DIG. 2;
15/53 A; 15/97 R
[58] Field of Search ............... 15/28, 29, 53 A, 97 R,
15/97 B, 4, DIG. 2

[56] References Cited

U.S. PATENT DOCUMENTS

| | | | |
|---|---|---|---|
| 2,804,635 | 9/1957 | Wilson | 15/53 A |
| 3,192,547 | 7/1965 | Nahrstedt et al. | 15/4 |
| 3,448,476 | 6/1969 | Zaccone | 15/97 R |
| 3,775,800 | 12/1973 | Veneziani | 15/28 |

Primary Examiner—Edward L. Roberts
Attorney, Agent, or Firm—Harness, Dickey & Pierce

[57] ABSTRACT

An automobile polishing apparatus including a main frame supported on wheels for movement around the automobile to be polished and upon which is mounted a polishing wheel for polishing the sides and front and rear of the automobile and a portable polishing unit which is adapted to be hand held for polishing the upper surfaces of the automobile. The preferred design includes a reversible drive for the polishing wheel, a brake for restraining movement of the apparatus along the floor, a pair of oppositely rotated polishing heads on the portable polishing unit, a hydraulic drive for the polishing heads, and an electric power supply including ring and brush contacts permitting free movement of the apparatus around the automobile.

9 Claims, 8 Drawing Figures

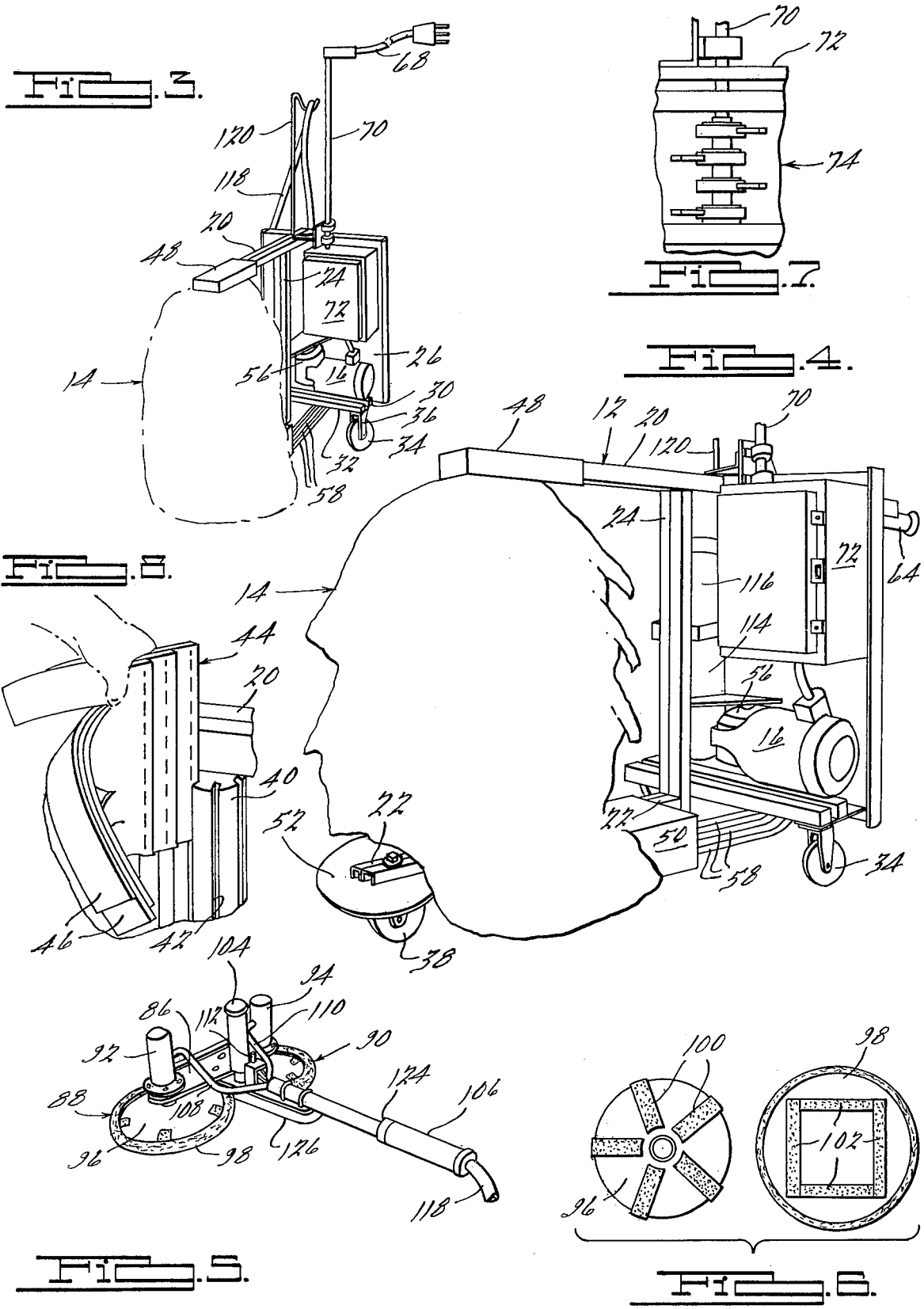

4,045,836

AUTOMOBILE POLISHING APPARATUS

SUMMARY OF THE INVENTION

The present invention relates to automobile polishing apparatus.

It is an object of the present invention to provide an improved apparatus which may be moved around the automobile for polishing the sides, front and rear of the automobile and which includes portable hand held means for polishing the upper surfaces of the automobile.

Another object of the invention is to provide such an automobile polishing apparatus having a polishing wheel and a reversible drive for the polishing wheel to provide improved polishing of the automobile.

It is also an object of the invention to provide a brake for restraining movement of the apparatus along the floor which brake may be set either to prevent movement along the floor or to provide a desired degree of drag opposing movement resulting from the engagement of the polishing wheel with the automobile during the polishing thereof.

Another object is to provide such an automobile polishing apparatus in which the portable polishing unit has a pair of oppositely rotating polishing heads.

More specifically, it is an object to provide such an automobile polishing apparatus in which the portable polishing unit has a hydraulic drive.

A further object is to provide such an automobile polishing apparatus which is electrically powered and includes ring and brush contacts in the electrical power connection permitting the polishing apparatus to be freely moved about the automobile without twisting and entangling the power line.

DESCRIPTION OF THE DRAWINGS

Other objects of the present invention will be apparent from a consideration of the following specification, the appended claims and the accompanying drawings throughout the several views of which like reference characters designate like parts and wherein:

FIG. 3 is a perspective view similar to FIG. 1 showing the opposite side of the apparatus;

FIG. 4 is an enlarged perspective view similar to FIG. 3 and showing the polishing wheel broken away;

FIG. 5 is a perspective view of the portable polishing unit of the embodiment of the preceding figures;

FIG. 6 is a view showing the supporting disc and the polishing pad of the portable polishing unit and showing the cooperating means for securing the polishing pad to the supporting disc;

FIG. 7 is a view of the interior of the electrical box showing the ring and brush connection; and FIG. 8 is a broken enlarged perspective view showing the polishing wheel hub and one of the polishing elements mounted therein.

DESCRIPTION OF THE PREFERRED EMBODIMENT

Figure 1:
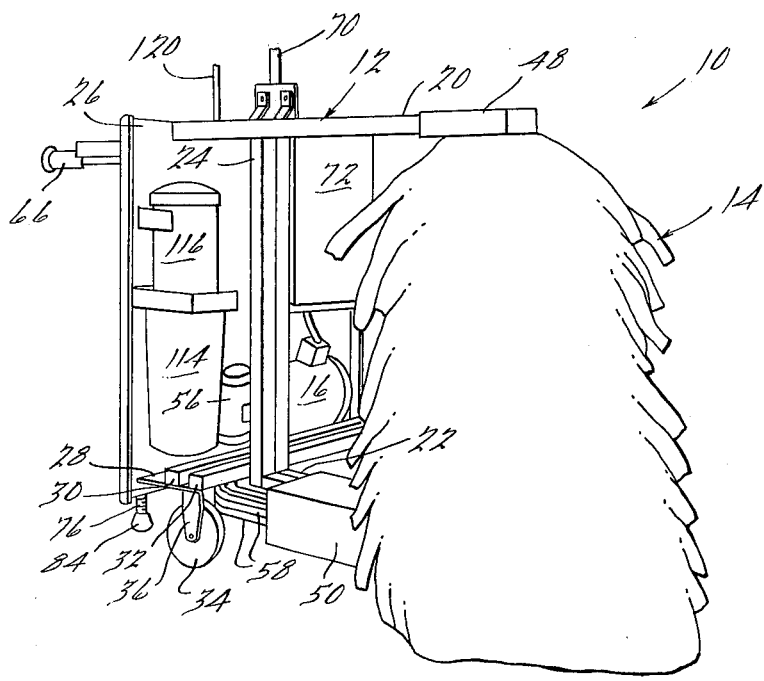
FIG. 1 is a perspective view of a preferred embodiment of the automobile polishing apparatus.

Referring to the drawings the automobile polishing apparatus 10 generally comprises a main frame 12, a large rotary polishing wheel 14 mounted on the frame 12 and driven by an electric motor 16 also mounted on the frame 12 and a portable polishing unit 18 carried on the frame 12 and adapted to be hand-held by the operator for polishing the upper surfaces of the automobile.

The main frame 12 is generally in the shape of a horizontal T as viewed from above the leg thereof extending in what may be referred to as a forwardly direction and consisting of vertically spaced upper and lower frame members 20 and 22, respectively. These frame members 20 and 22 are interconnected adjacent the crossbar of the T by a vertically disposed frame member 24. The crossbar of the T is formed by a vertically disposed structural plate 26 secured to the rear end of the upper frame member 20. The plate 26 adjacent its lower edge is connected by strips 28 to horizontal frame elements 30 and 32 the latter of which is secured to vertical frame member 24 adjacent its lower end. The automobile polishing apparatus 10 is supported for rolling movement along the floor or other supporting surface by a pair of rear wheels 34 mounted under the opposite ends of the frame elements 30 and 32 by brackets 36 secured to the strips 28, and a third, front wheel 38 mounted under the outer or forward end of the lower frame member 22.

Figure 2:
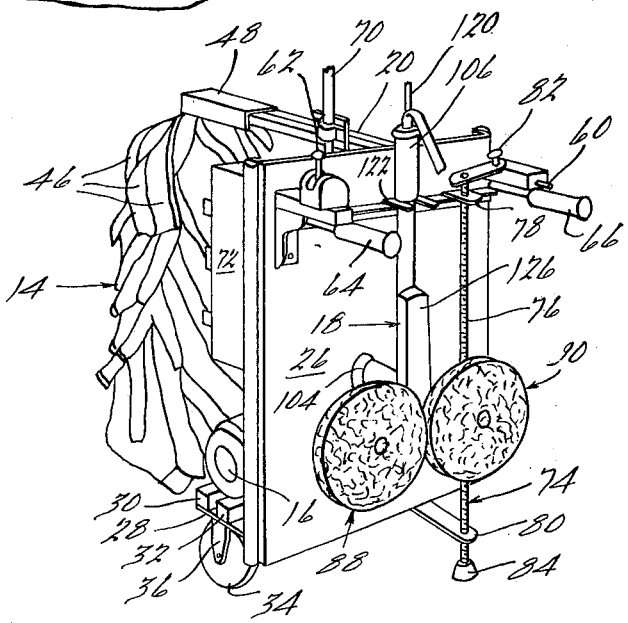
FIG. 2 is a perspective view of the same embodiment looking in a direction substantially opposite to that of FIG. 1.

The polishing wheel 14 is rotatably supported by the frame members 20 and 22 at a point spaced inwardly from the front wheel 38. The polishing wheel 14 is of conventional construction and commercially available from Belanger Inc. of Northville, Mich. For the present purposes it is sufficient to state that the wheel 14 has a drum-shaped hub 40 having a plurality of circumferentially spaced axially extending slots 42 having an opening through the circumference of the hubs 40. The wheel also includes a plurality of polishing elements 44 each having an edge portion adapted to be slid axially into one of the slots 42 and hold the polishing element 44 against movement out of the slot 42 in a direction radially of the hub 40. Each of the polishing elements 44 has a plurality of strips 46 of a suitable material for polishing an automobile to which a wax or other suitable material has been applied. It will be appreciated that the strips 46 hang limp as illustrated in FIGS. 1, 2 and 3 when the polishing wheel 14 is not rotating but that they are flung out horizontally when the wheel 14 is rotating. The frame 12 is so proportioned and the vertically disposed polishing wheel 14 is of such height, or axial extent, that it can polish the sides of the automobile substantially up to the side windows. The upper frame member 20 carries a shroud 48 to prevent the strips 46 from becoming caught or entangled with the member 20 or the rotary mounting of the wheel 14 in the frame member 20. The lower frame member 22 also carries a shroud 50 to prevent entanglement of the strips 46 with member 22 or with the drive (hereinafter described) for the wheel 14 disposed below the frame member 22. At its outer end the frame member 22 also carries a guard plate 52 for preventing entanglement of the strips 46 with the front wheel 38 and its mounting on the frame member 22.

The polishing wheel 14 is driven by the electric motor 16 which is mounted on the front side of the plate 26, through a gear box 56. The drive from the gear box 56 to the polishing wheel 14 is through a plurality of pulley V-belts 58 disposed below the frame member 22 and trained over pulley wheels (not shown) provided on the output shaft of the gear box 56 and on the polishing wheel 14. Operation of the electric motor 16 is controlled by an on-off switch 60 and by a forward-reverse switch 62. The rear side of the plate 26 is provided with left and right handles 64 and 66 respectively and the forward-reverse switch 62 is mounted adjacent the left handle 64 and the on-off switch 60 is mounted adjacent the right handle 66. This latter switch is of the type sometimes referred to as a dead man's switch since it must be held in a depressed position to be on and is yieldably urged to its outer off position.

Electric power is supplied to the electric motor 16 through a cord 68 adapted to be plugged into a conventional power outlet. The cord 68 extends through a vertically disposed pipe or conduit 70 which is mounted on the frame 12 for rotary movement and at its lower end extends into an electrical box 72 mounted on the front of the plate 26 above the electric motor 16. Within the box 72 is a conventional ring and brush contact assembly 74 permitting the conduit 70 to rotate as the automobile polishing apparatus is moved around the automobile and prevent twisting and entangling of the cord. The conduit 70 extends upwardly to a height sufficient to permit the cord 68 to pass over the top of the automobile without rubbing on it.

Adjacent the right handle 66 the polishing apparatus includes a brake generally indicated at 74 and comprising a vertically disposed externally threaded brake rod 76 threaded through spaced supports 78 and 80. At its upper end the brake rod 76 has a handle 82 for effecting rotation thereof and at its lower end it as a foot or cup 84 of rubber or other suitable material adapted to engage the floor or other supporting surface. It will be appreciated that when the wheel 14 is in operation and in engagement with a surface of the automobile it will produce a force urging the polishing apparatus to move along the floor. The brake 74 may be operated to press the foot 84 against the floor to provide a desired restraint against such movement and, of course, may also be employed to completely stop and prevent movement of the polishing apparatus along the floor.

The portable polishing unit 18, best illustrated in FIGS. 2 and 5 also has a T-shaped frame 86. The cross-arm thereof is of plate or sheet metal and carries at the opposite ends thereof a pair of polishing heads 88 and 90 secured to the output shafts of hydraulic motors 92 and 94. Each of the heads 88 and 90 includes a support disc 96 and a polishing pad 98 removably secured to the disc for rotation therewith. While it will be appreciated that the pad may be secured to the disc by any suitable means, in the preferred embodiment illustrated the pad is secured to the disc by conventional cooperating hook and link sections, one conventional type of which is commercially marketed under the trademark Velcro. Strips of one of the cooperating hook and link sections is secured to the disc 96, as indicated at 100 in FIG. 6, and strips of the other of the sections is secured to the adjacent face of the polishing pad, and are indicated at 102 in FIG. 6. The strips may be secured in place by any suitable means.

The portable polishing unit 18 is provided with two handles 104 and 106, the handle 104 being mounted on the leg of the frame 86 adjacent its cross-arm and the handle 106 being secured to and extending beyond the outer end of the leg of the frame 86. The handle 106 is hollow and through it pass the hydraulic fluid supply and return lines 108 and 110 and the electrical conductors to a switch 112 mounted on the leg of the frame 86 adjacent the handle 104. The hydraulic lines 108 and 110 connect the hydraulic motors 92 and 94 to a hydraulic pump 114 (see FIG. 1) which is mounted on the front side of the structural plate 26 and is driven by a second electric motor 116. The construction of the motors 92 and 94 and the hydraulic connections thereto are such that these motors drive the polishing heads 88 and 90 in opposite directions thereby substantially eliminating any resultant force, resulting from the engagement of the polishing pads with the automobile surface being polished, tending to move the portable polisher along that surface. The bundle of hydraulic lines and the electrical cord extending from the outer end of the handle 106 may be taped or otherwise suitably held together to form an umbilical connection indicated at 118 between the portable polishing unit 18 and the hydraulic pump 114 and the electrical box 72 both mounted on the plate 26 of the main frame 12. This umbilical cord 118 in the preferred embodiment is about fifteen feet in length and a hangar rod 120 is mounted on the upper frame member 20 and extends upwardly therefrom for supporting the umbilical cord.

The portable polishing unit when not in use is supported at the rear of the plate 26 on a U-shaped bracket 122 which is adapted to be engaged by a shoulder 124 on the handle 106. The position of the portable polishing unit is shown in FIG. 2.

In the operation of the polishing apparatus, after the polishing material has been applied to the automobile, one operator may manipulate the main frame to employ the polishing wheel 14 to polish the sides, front and rear of the automobile while a second operator is employing the hand-held portable polishing unit 18 to polish the upper surfaces of the automobile. In driving the polishing wheel in a forward direction it is noted that the polish strips will not fully polish all areas adjacent changes in the configuration of the automobile surface. These areas, however, can be properly polished by reversing the direction of rotation of the polishing wheel 14 by operation of the switch 62 and again passing over that area. The position of mounting of the wheel 14 adjacent the outer end of the frame members 20 and 22 enables the wheel to be moved against the automobile from a maximum number of angles and enables better polishing.

The operator using the hand-held portable polishing unit 18 may encounter relative abrupt changes in contour where ridges may move between the adjacent surfaces of the slightly spaced polishing pads 98. To prevent any damage to the finish on such ridges the lower side of the portable frame 86, the side toward the automobile during polishing is covered with a pad 126 of sponge rubber or other suitable material.

While only one specific embodiment has been illustrated and described in detail herein, it will be appreciated that changes may be made therein without departing from the scope of the present invention.

What is claimed is:

1. Automobile polishing apparatus comprising a main frame, wheel mounted on the frame supporting it for rolling movement about the automobile, a large polishing wheel mounted on the frame for rotation about a vertical axis and adapted to polish the side panels and the front and rear of the automobile, portable rotatable polishing means mounted on said frame and adapted to be hand-held for use in polishing the upper surfaces of the automobile including the top, the hood and the deck, means mounted on said main frame for rotating said polishing wheel and means connected to said polishing means for rotating it, wherein said means mounted on said main frame and said last named means each include an electric motor, a first electric switch for controlling the supply of electric power to said motor of said means mounted on said main frame, a second electric switch for controlling the supply of electric power to the electric motor of the last named means, common means for supply electric power to both of said switches including electric cord means for connection to a suitable source of external power, a vertically disposed rotatable shaft having ring contacts connected to said electric cord means, and brush contacts connected to said switches whereby said cord means will not become twisted in moving the polishing apparatus around automobiles in the polishing thereof.

2. Automobile polishing apparatus as defined in claim 1 wherein said first switch includes means yieldably urging it to an open circuit position.

3. Automobile polishing apparatus comprising a main frame, wheels mounted on the frame supporting it for rolling movement about the automobile, a large polishing wheel mounted on the frame for rotation about a vertical axis and adapted to polish the side panels and the front and rear of the automobile, portable rotatable polishing means mounted on said frame and adapted to be hand-held for use in polishing the upper surfaces of the automobile including the top, the hood and the deck, means mounted on said main frame for rotating said polishing wheel and means connected to said polishing means for rotating it, including brake means mounted on said main frame for restraining movement of said apparatus along the floor or other supporting surface, wherein said brake means includes a brake shaft rotatably mounted on said main frame and a foot adapted to be pressed against the floor or other supporting surface.

4. Automobile polishing apparatus comprising a main frame, wheels mounted on the frame supporting it for rolling movement about the automobile, a large polishing wheel mounted on the frame for rotation about a vertical axis and adapted to polish the side panels and the front and rear of the automobile, portable rotatable polishing means mounted on said frame and adapted to be hand-held for use in polishing the upper surfaces of the automobile including the top, the hood and the deck, means mounted on said main frame for rotating said polishing wheel and means connected to said polishing means for rotating it, wherein said last named means comprises a hydraulic pump mounted on said main frame, a hydraulic motor mounted on said portable rotatable polishing means, in fluid conduit means connecting said pump and said hydraulic motor.

5. Automobile polishing apparatus comprising a main frame, wheels mounted on the frame supporting it for rolling movement about the automobile, a large polishing wheel mounted on the frame for rotation about a vertical axis and adapted to polish the side panels and the front and rear of the automobile, portable rotatable polishing means mounted on said frame and adapted to be hand-held for use in polishing the upper surfaces of the automobile including the top, the hood and the deck, means mounted on said main frame for rotating said polishing wheel and means connected to said polishing means for rotating it, wherein said portable rotatable polishing means comprises a portable frame, a polishing head rotatably mounted on said portable frame, and wherein said means for rotating said polishing means comprises a motor mounted on said portable frame, power supply means mounted on said frame and means connecting said power supply means to said motor.

6. Automobile polishing apparatus as defined in claim 5 wherein said power supply comprises a hydraulic pump and an electric motor connected to the pump for driving the same, said motor mounted on said portable frame is a hydraulic motor, and said connecting means are flexible fluid conduit means.

7. Automobile polishing apparatus as defined in claim 6 wherein said polishing head includes a support disc connected to said hydraulic motor to be driven thereby and a polishing pad mounted on said disc for rotation therewith.

8. Automobile polishing apparatus as defined in claim 7 wherein said disc and said pad have cooperating Velcro-type hook and link sections mounted thereon for releasably securing said pad to said disc for rotation therewith.

9. Automobile polishing apparatus as defined in claim 5 including a second polishing head rotatably mounted on said portable frame and said means for rotating said polishing means includes means for rotating said polishing heads in opposite directions.

* * * * *

UNITED STATES PATENT OFFICE
CERTIFICATE OF CORRECTION

PATENT NO. : 4,045,836
DATED : September 6, 1977
INVENTOR(S) : Robert M. Glenn

It is certified that error appears in the above-identified patent and that said Letters Patent are hereby corrected as shown below:

Column 1, line 59, after "brush" insert --contact--

Column 6, line 3, "in" should read --and--.

Signed and Sealed this

Twentieth Day of December 1977

[SEAL]

Attest:

RUTH C. MASON
*Attesting Officer*

LUTRELLE F. PARKER
*Acting Commissioner of Patents and Trademarks*